Aug. 20, 1968  C. B. ASKE, JR., ET AL  3,397,920
MEANS FOR SECURING VEHICLE WHEEL TRIM TO VEHICLE WHEELS
Filed Oct. 31, 1967  2 Sheets-Sheet 2
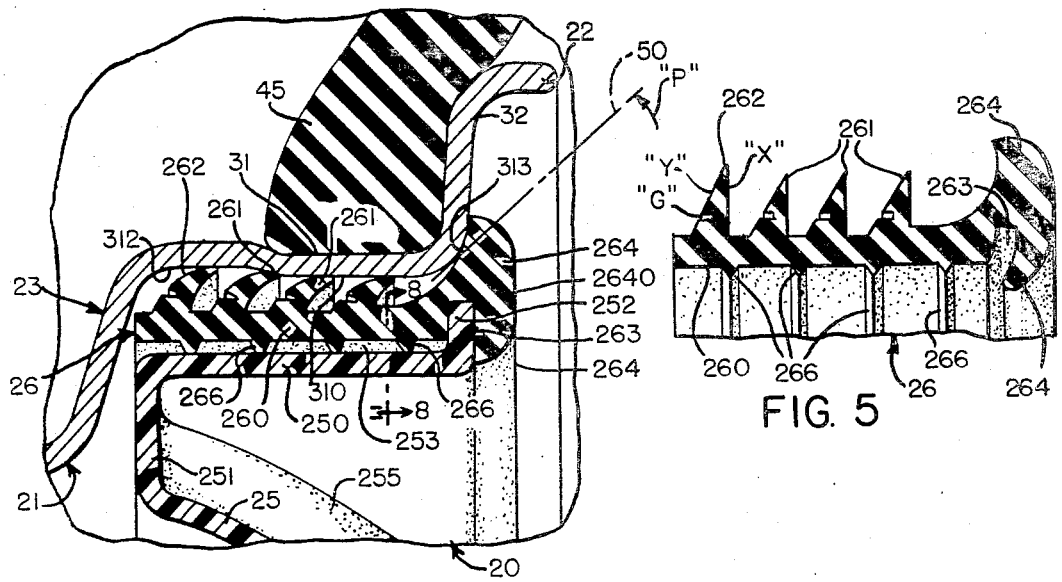
FIG. 4
FIG. 5
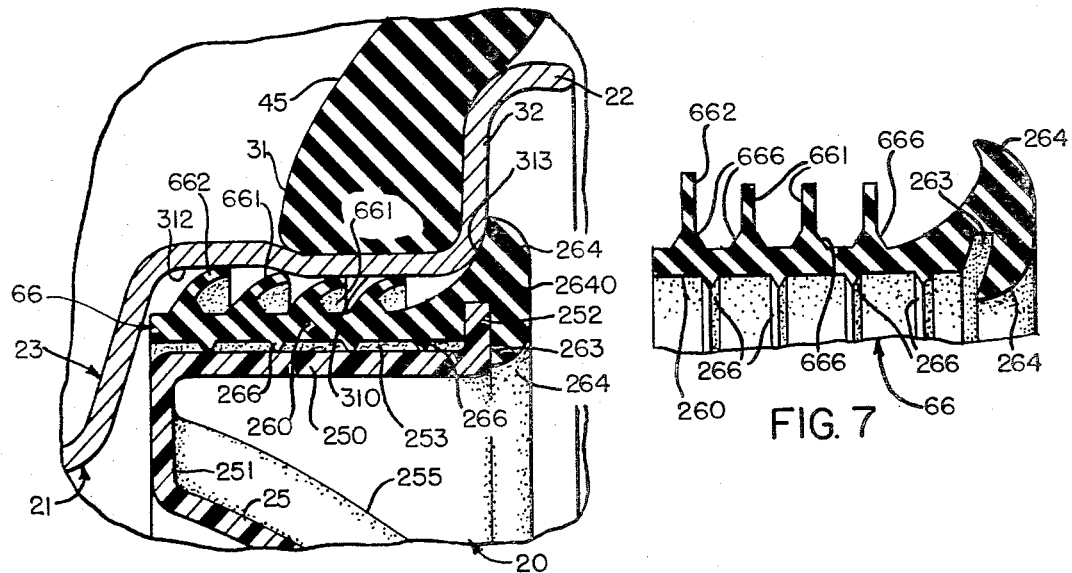
FIG. 6
FIG. 7
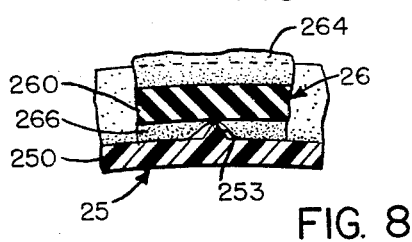
FIG. 8
INVENTORS
CHARLES B. ASKE, JR.,
& EDWARD L. WOOD
BY
*Everett G. Wright*
ATTORNEY

United States Patent Office 3,397,920
Patented Aug. 20, 1968

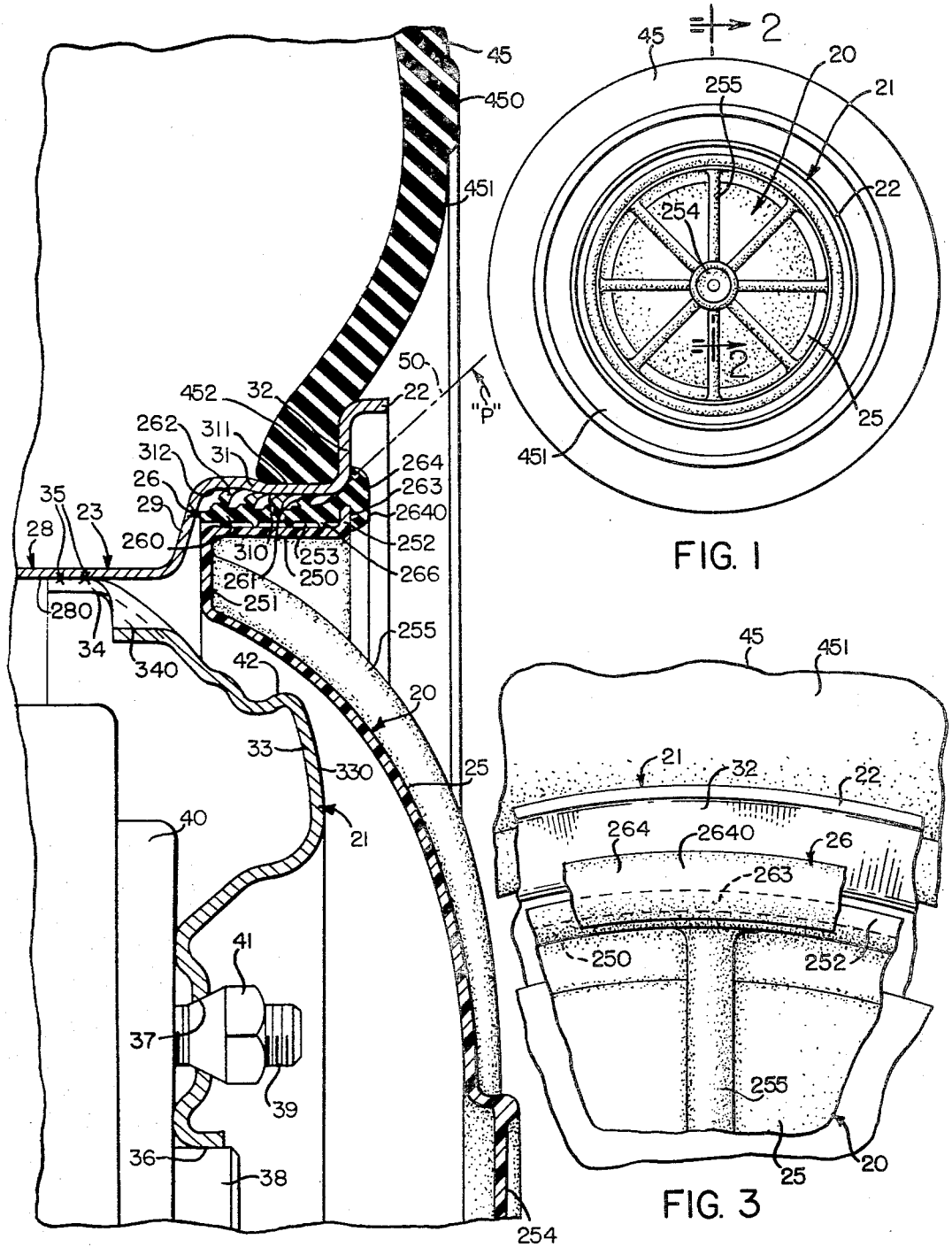

3,397,920
MEANS FOR SECURING VEHICLE WHEEL
TRIM TO VEHICLE WHEELS
Charles B. Aske, Jr., Birmingham, Mich., and Edward L.
Wood, Gig Harbor, Wash., assignors to Gar Wood Industries, Inc., a corporation of Michigan
Filed Oct. 31, 1967, Ser. No. 679,320
2 Claims. (Cl. 301—37)

ABSTRACT OF THE DISCLOSURE

Means for removably securing vehicle wheel trim to drop center rim type vehicle wheels having an axially outwardly disposed tire bead seat annulus wherein a vehicle wheel trim assembly consisting of a plastic or metal wheel trim element having an axially disposed annular anchorage flange over which is positioned a resilient rubber anchorage ring including a plurality of annular radially disposed axially spaced circumferential teeth formed integral therewith and particularly shaped to flex readily and admit of ease in mounting the wheel trim assembly on a vehicle wheel with the toothed portion of the said resilient rubber anchorage ring flexed axially outwardly and disposed in firm resilient engagement with the tire bead seat annulus of said vehicle wheel, the said axially spaced circumferential teeth of the resilient rubber anchorage ring further permitting substantial differentials in expansion and contraction of the flange of said wheel trim element and the vehicle wheel while maintaining the said wheel trim assembly firmly on said vehicle wheel, the said vehicle wheel trim assembly being formed to be initially much more resistant to removal from said vehicle wheel than to mounting it thereon.

---

This invention relates to improved means for securing vehicle wheel trim on vehicle wheels.

Formerly resilient rubber axially spaced circumferential axially outwardly slanted toothed means were employed for securing vehicle wheel trim to vehicle wheels by engaging the tire bead seat annulus of the drop center type wheel rim thereof. Difficulties were encountered with the resilient toothed securing means engaging the wheel rim either too firmly or too loosely due to variations in the internal diameter of the said tire bead seat annulus of the vehicle wheel rim occurring in different manufacturing runs of vehicle wheels. If the tire bead seat annulus were somewhat undersize, it was too difficult to mount the wheel trim on a vehicle wheel and practically impossible to remove the same therefrom without damage to the metal or plastic portion thereof. This was occasioned by differentials in manufacturing tolerances in the diameter of the tire bead seat annulus of drop center type vehicle wheels as between different wheel manufacturers, and, in addition, in plastic wheel trim constructions, differences in expansion and contraction factors between the plastic wheel trim and the metal vehicle wheel rim added to the aforesaid difficulties. Obviously, the resilient rubber securing means is formed to securely hold wheel trim on vehicle wheels of a particular nominal size, and, as a result, in instances where the tire bead seat annulus of the vehicle wheel is somewhat undersize, excessive axial pressure or hammering is required to mount the wheel trim on the vehicle wheel, and extensive prying is required to remove it therefrom. Excess pounding-on and prying-off of vehicle wheel trim to mount or demount it from vehicle wheels ofttimes causes damage to the vehicle wheel trim particularly when the wheel trim is formed of plastic or light sheet metal or a combination of such materials. Also, difficulties are encountered with proper and adequate securement of plastic vehicle wheel trim on vehicle wheels due to differentials in expansion and contraction of the plastic wheel trim and the steel vehicle wheel occasioned by using motor vehicles in both hot and cold weather conditions.

With the foregoing in view, the primary object of this invention is to provide improved resilient means for removably securing vehicle wheel trim on vehicle wheels which permits said wheel trim to be relatively easily and readily mounted on the vehicle wheel, which firmly holds the vehicle wheel trim in place during use while automatically compensating for differentials in expansion and contraction of plastic wheel trim with respect to the metal vehicle wheel, and which permits the wheel trim to be manually removed from the vehicle wheel without damage to the vehicle wheel trim or its securing means.

More specifically, it is an object of this invention to provide in a vehicle wheel trim assembly improved means for removably securing vehicle wheel trim to drop center rim type vehicle wheels having an axially outwardly disposed tire bead seat annulus, the said vehicle wheel trim assembly preferably comprising a vehicle wheel trim of plastic or metal including a generally axially disposed annular anchorage flange onto the outer periphery of which is mounted an annular resilient rubber anchorage ring having a plurality of annular radially or radially and axially outwardly disposed axially spaced circumferential anchorage teeth integral therewith, which anchorage teeth are particularly formed to flex readily axially outwardly for ease in mounting said wheel trim on said vehicle wheel with said annular anchorage flange and the rubber anchorage ring thereon disposed within said tire bead seat annulus of said vehicle wheel; the said circumferential anchorage teeth also being capable of being flexed axially inwardly responsive to manual application of axially outward removal pressure on said vehicle wheel trim assembly, the said anchorage teeth being formed to provide an initial relatively firm resistance against axial removal of said wheel trim assembly from said vehicle wheel followed by a relatively minimal ultimate resistance against said removal of said wheel trim assembly from said vehicle wheel—all while compensating for differentials in expansion and contraction of said vehicle wheel rim and said vehicle wheel trim.

Other objects of this invention will become apparent by reference to the following detailed description taken in connection with the accompanying drawings, in which:

FIG. 1 is a side elevational view of a vehicle wheel and tire having mounted on said vehicle wheel a combined vehicle wheel cover and rim trim embodying the invention.

FIG. 2 is an enlarged fragmentary sectional view taken on the line 2—2 of FIG. 1.

FIG. 3 is an enlarged fragmentary elevational view with parts broken away showing the wheel cover and rim trim disclosed in FIGS. 1 and 2.

FIG. 4 is an enlarged detailed fragmentary sectional view of the wheel cover and rim trim means for securing the same on the vehicle wheel as disclosed in FIGS. 1, 2 and 3.

FIG. 5 is an enlarged sectional view of the resilient securing means disclosed in FIGS. 2 and 4.

FIG. 6 is an enlarged detailed fragmentary sectional view of a wheel cover and rim trim and an alternate means for securing the same on the vehicle wheel.

FIG. 7 is an enlarged sectional view of the securing means disclosed in FIG. 6 as extruded.

FIG. 8 is a fragmentary sectional view taken on the line 8—8 of FIGS. 4 and 6.

Referring now to the drawings wherein like reference characters refer to like and corresponding parts throughout the several views, the particular wheel trim 20 of the invention disclosed in FIGS. 1–5 inclusive for illustrative purposes consists of a bubble or dome shaped wheel cover element 25 terminating at its outer periphery in an axially outwardly extending rim trim or anchorage flange 250 formed integral with the said wheel cover element 25. A resilient annular anchorage element 26 of rubber or the like is suitably firmly disposed or secured around the outer periphery of the said anchorage flange 250 of the wheel cover element 25.

The said resilient anchorage element 26 is provided with a plurality of radially outwardly disposed axially spaced circumferential teeth integral therewith particularly formed as hereinafter described in detail to flex readily axially outwardly and engage the tire bead seat annulus 310 of the tire bead seat 31 of the vehicle wheel rim 23 when the said wheel cover and rim trim assembly 20 is mounted on a vehicle wheel 21 and to readily reverse their position when the said vehicle wheel trim assembly 20 is pried off the vehicle wheel, the said particularly formed resilient anchorage element 26 further providing means to compensate for differentials in the expansion and contraction of the vehicle wheel 21 and the wheel trim 20 over the wide ranges of temperature changes to which vehicle wheels and wheel trim are subjected.

The said vehicle wheel 21 has a drop center rim 23 composed of a central channel or drop center 28 having side walls 29 and a base 280. An annular tire bead seat 31 extends laterally outwardly from each of the side walls 29 of the drop center 28, each said tire bead seat 31 preferably having an annular radially outwardly facing tire bead seat pocket 311 formed therein adjacent a tire bead seat flange 32 extending radially outwardly therefrom, the said tire bead seat flange 32 being axially outwardly curved at its upper portion to form an axially disposed outer lip 22. The said tire bead seat flange 32 is ofttimes referred to as the wheel flange, the said lip 22 is ofttimes referred to as the lip of the wheel rim, and the radially inner exposed annular face of the tire bead seat 31 is generally referred to as the tire bead seat annulus 310. The formation of the said tire bead seat pocket 311 in the tire bead seat annulus 310 provides an annular radially inwardly facing tire bead seat anchorage recess 312 which readily is employed to receive at least one elongated axially inner anchorage tooth 262 of the resilient wheel trim anchorage means 26.

Within the drop center 28 of the drop center rim 23 is a wheel spider 33 having an axially disposed flange 34 which is secured to the base 280 of the drop center 28 of the drop center rim 23 by such means as welding at 35. The said wheel spider 33 is generally provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nuts 42 over which a conventional hub cap (not shown) may be sprung for securement onto the vehicle wheel 21. However, in the instant invention, the hub cap need not be employed, since the wheel spider may be suitably painted and/or provided with chrome finished wheel securing nuts. Also, other attractive preferably relatively high reflectance ornamentation may be used on the wheel spider spaced from the wheel cover element 25. However, if the vehicle wheel 21 is provided with a hub cap (not shown) of relatively high reflective qualities, such may be used with a suitably transparent wheel cover element 25 of a selected color spaced thereover thereby providing a highly desirable aesthetic effect with third dimension qualities.

The particular tire 45 illustrated in the drawings is a tubeless tire having a scuff bead 450 extending from its side wall 451. The tire side wall 451 terminates in a suitable mounting bead 452 which seats in the said annular tire bead seat pocket 311 formed in the tire bead seat 31 of the wheel rim 23.

Referring now particularly to FIGS. 1–5 inclusive and FIG. 8, the particular embodiment of wheel trim of the invention shown therein for illustrative purposes comprises a generally dome shaped wheel cover element 25 of a molded or otherwise formed plastic material of a selected color or tint terminating at its outer periphery in a radially outwardly disposed annular connector flange 251 having at its outer periphery an axially disposed annular anchorage flange or rim trim 250 terminating at its outer periphery in a radially disposed circumferential retainer flange 252. Obviously, by omitting the dome shaped wheel cover element 25 and its connector flange 251, there would remain the anchorage flange or rim trim unit 250 having a radially disposed circumferential retainer flange 252, which rim trim unit 250 could be used by itself as a rim trim member, and it is so contemplated. For ornamental purposes, the dome shaped wheel cover element 25 may be provided with a central hub 254 and radially disposed ribs 255. Obviously, the said wheel cover element 25 may be styled with other selected aesthetic designs if desired.

This invention employs an improved preferably live rubber retainer ring anchorage means 26 having an annular axially disposed anchorage portion 260 which is telescopingly assembled on the said anchorage flange 250 of the wheel cover element 25, and includes integral therewith a plurality of radially disposed axially spaced circumferential teeth 261 and 262 which are particularly formed to flex readily axially outwardly for ease in mounting wheel trim on a vehicle wheel with the said anchorage flange 250 and the anchorage retainer ring 26 thereon disposed within the tire bead seat annulus 310 of the vehicle wheel 21. The said circumferential anchorage teeth 261 and 262 also are capable of being readily flexed axially inwardly responsive to manual application of axially outward removal pressure on said vehicle wheel trim assembly. The said anchorage teeth 261 and 262 are of a particular form to provide an initial relative firm resistance against axial removal of the wheel trim assembly from the vehicle wheel while being sufficiently resilient to adequately compensate for differentials in expansion and contraction of the metal wheel rim and the plastic wheel trim with respect to each other, all while properly removably securing the wheel trim on the vehicle wheel under extreme weather and road shock conditions of use. It is preferable that at least one of the axially innermost teeth of the axially spaced annular resilient teeth of the anchorage ring 26 is longer than the others. Thusly, the longer annular resilient anchorage tooth 262 falls completely within the annular tire bead seat anchorage recess 312 of the annular tire bead seat 311 of the drop center rim 23, while the other shorter axially spaced annular resilient teeth 261 flex against the tire bead seat 311 axially outwardly of the said annular tire bead seat anchorage recess 312. Obviously, in certain vehicle wheels where the tire bead seat 31 is quite wide, the tire bead seat anchorage recess 312 is correspondingly wider, and axially innermost of the short annular resilient teeth 261 may become disposed partially or wholly within the said annular tire bead seat anchorage recess 312 as indicated in FIG. 4.

The resilient anchorage ring 26 is preferably interlocked on the radially outwardly disposed annular retainer flange 252 of the anchorage flange 250 of the wheel cover or wheel trim element 25 by providing a circumferential groove 263 in the inner annulus of the said resilient anchorage ring 26 which receives the said annular retainer flange 252 when the said resilient anchorage ring 26 is assembled over the outer periphery of the said anchorage flange 250 of the said wheel trim element 25.

The said resilient anchorage ring 26 is preferably provided with a rather substantial annular outer flange 264 which is formed at 265 to bear against the tire bead seat flange 32 of the wheel rim 22 substantially at the juncture 313 of the annular tire bead seat 31 and the tire bead seat flange 32 as best shown in FIGS. 2 and 4. The said annular outer flange 264 of the resilient anchorage means 26 also serves to provide an annular ornamental band 2640 at the outer periphery of the vehicle wheel trim 20. For example, by forming the said resilient anchorage means 26 of white resilient rubber, the ornamental band 2640 would be white. It is obvious that other colors could be used which would provide an ornamental band 2640 of any selected color.

By reference to FIG. 4 it will be observed that the lower portion of the said axially outer radially disposed flange 264 of the resilient anchorage means or ring 26 is extruded or molded on a substantial axially and radially inward disposition so that, when the said resilient anchorage means 26 is assembled on the wheel cover element 25, and the vehicle wheel trim 20 is mounted on a vehicle wheel as shown in FIG. 1, the said axial flange 264 of the resilient anchorage means 26 bears firmly both at its upper portion at 265 substantially against the juncture 313 of the annular tire bead seat 31 and the tire bead seat 32 of the rim 23 of the vehicle wheel 21 and at its bottom or outer flange 264 against the axially outer radially disposed circumferential retainer flange 252 of the anchorage flange 250 of the wheel cover element 25 as shown in FIG. 2.

If desired, additional interlocking of the resilient anchorage means 26 and the wheel cover element 25 may be provided to more positively prevent all possibilities for circumferential ratcheting and/or unwanted axial slippage of the wheel cover element 25 with respect to the said resilient annular anchorage means 26 and to further assure firm removable mounting of the vehicle wheel trim 20 on a vehicle wheel 21 within the tire bead seat annulus 310 of the drop center rim 23 thereof. This additional interlocking means preferably comprises the providing on the inner annulus of the resilient annular anchorage means 26 a plurality of axially spaced circumferential preferably inverted V-shaped ribs 266, and by providing on the outer periphery of the annular axially outwardly extending anchorage flange 250 of the wheel cover element 25 a plurality of circumferentially spaced axially disposed inverted V-shaped ribs 253. The said ribs 253 and 266 are best shown in their interlocked relationship in FIG. 8 which illustrates how the axially disposed hard ribs 253 of the wheel cover element 25 embed themselves into the relatively softer circumferential ribs 266 of the resilient anchorage means 26 and thereby positively prevent relative axial and circumferential invention is mounted on a vehicle wheel trim of the invention is mounted on a vehicle wheel.

In the embodiment of the invention shown in FIGS. 1–4 inclusive and in FIG. 8, the axially spaced resilient circumferential teeth 261 and 262 of the anchorage ring 26 are shown to be of triangular shape preferably but not limited to having the axially outer wall X thereof generally vertical while the axially inner wall Y thereof is diagonally sloping which makes the said circumferential teeth 261 and 262 triangular in cross sectional shape while being disposed radially outwardly from the annularly disposed anchorage portion 260 of the annular anchorage means 26. The said circumferential teeth 261 and 262 are preferably provided with an annularly disposed axially extending relatively narrow groove G in the diagonally sloping axially inner wall Y providing a greater flexibility of the said teeth 261 and 262 when the vehicle wheel trim 20 is telescoped onto the vehicle wheel 21 within the tire bead seat annulus 310 of the wheel rim 23. This admits of relative ease in mounting the vehicle wheel trim 20 on the vehicle wheel 21, and avoids unnecessary heavy pounding or pressure to be applied to the said vehicle wheel trim 20 when mounting the said wheel trim 20 on the vehicle wheel 21. The particular width and shape of the annular groove G is selected to relieve the amount of prying pressure necessary to be applied by a screwdriver or other pry 50 at P to remove the wheel trim 20 from the vehicle wheel 21 during which prying-off the said annular anchorage teeth 261 and 262 are caused to flex and assume a reverse position to that shown in FIG. 4. Thus, the instant invention provides means for selecting the mounting and the demounting pressures required, which is important when the wheel cover element 25 of the vehicle wheel trim 20 is formed of relatively thin plastic having a coefficient of expansion somewhat higher than that of steel.

Referring now to FIGS. 6 and 7 wherein is shown an alternate embodiment of the instant invention designated by the reference numeral 600 employing an annular anchorage means 66 which is like and similar to the anchorage means 26 of the embodiment of the invention disclosed in FIGS. 1–5 inclusive and FIG. 8 except that the circumferential teeth 661 and 662 are relatively thin and axially disposed terminating at the lower portion thereof adjacent the annularly disposed anchorage portion 260 of the said anchorage means 66 in a preferably pyramidal base as indicated at 666. This construction provides circumferential teeth 661 and 662 which will readily flex in either direction to avoid excess pounding and/or pressure to mount the vehicle wheel trim 600 on the vehicle wheel 21 or to pry it therefrom. The length and the resiliency of the annular teeth 661 and 662, the outer ends of which preferably have sharp corners as shown in FIG. 7, permit the vehicle wheel trim 600 to be readily mounted on and removed from the vehicle wheel 21, the removal thereof requiring the said circumferential anchorage teeth 661 and 662 to flex and assume a reverse position to that shown in FIG. 6. By changing the height and width of the pyramidal base portion 600 at the bottom of the circumferential teeth 661 and 662, a selection may be made with respect to allowances for differentials in the relative thermal expansion and contraction of the plastic wheel trim and metal wheel as well as for the mounting and demounting pressures required for plastic wheel trim to be mounted on a steel wheel as in the embodiment of the invention disclosed in FIGS. 1–5 inclusive and FIG. 8.

Although but a single embodiment of the invention and one modification thereof have been disclosed and described herein, it is obvious that many changes may be made in the size, shape, arrangement and detail of the various elements thereof, all without departing from the spirit and scope of the invention set forth in the appended claims.

We claim:

1. A plastic vehicle wheel trim of the type secureable to a vehicle wheel at the tire bead seat annulus thereof including an axially disposed annular anchorage flange terminating in an axially outer radially disposed retainer flange, an annular resilient rubber retainer ring telescopingly assembled over said annular anchorage flange of said wheel trim in engagement with the said retainer flange thereof, and a plurality of radially disposed axially spaced resilient circumferential flexible anchorage teeth on the outer periphery of said annular resilient retainer ring engageable with said tire bead seat annulus of said vehicle wheel when the assembly of said anchorage flange of said wheel trim and said circumferentially toothed resilient retainer ring is telescopingly mounted within the tire bead seat annulus of said vehicle wheel rim, the annular flexible teeth of said retainer ring being formed to allow for differentials in expansion and contraction of said wheel rim and said wheel trim and to simultaneously require substantially less axial pressure to mount said wheel trim on said vehicle wheel than to remove it therefrom, the axially spaced resilient flexible circumferential teeth of the resilient retainer ring being formed with a relatively narrow axially disposed groove in and along the axial inner portion thereof and located in the lower portion thereof.

2. A plastic vehicle wheel trim of the type secureable to a vehicle wheel at the tire bead seat annulus thereof including an axially disposed annular anchorage flange terminating in an axially outer radially disposed retainer flange, an annular resilient rubber retainer ring telescopingly assembled over said annular anchorage flange of said wheel trim in engagement with the said retainer flange thereof, and a plurality of radially disposed axially spaced resilient circumferential flexible anchorage teeth on the outer periphery of said annular resilient retainer ring engageable with said tire bead seat annulus of said vehicle wheel when the assembly of said anchorage flange of said wheel trim and said circumferentially toothed resilient retainer ring is telescopingly mounted within the tire bead seat annulus of said vehicle wheel rim, the annular flexible teeth of said retainer ring being formed to allow for differentials in expansion and contraction of said wheel rim and said wheel trim and to simultaneously require substantially less axial pressure to mount said wheel trim on said vehicle wheel than to remove it therefrom, the said axially spaced circumferential teeth of the resilient retainer ring being formed with a relatively narrow portion above a pyramidal lower portion and with their outer ends having relatively sharp corners.

References Cited

UNITED STATES PATENTS

| 2,812,215 | 11/1957 | Waite | 301—37 |
| 2,963,325 | 12/1960 | Aske et al. | 301—37 |
| 3,265,441 | 8/1966 | Baldwin | 301—37 |

RICHARD J. JOHNSON, *Primary Examiner.*